UNITED STATES PATENT OFFICE.

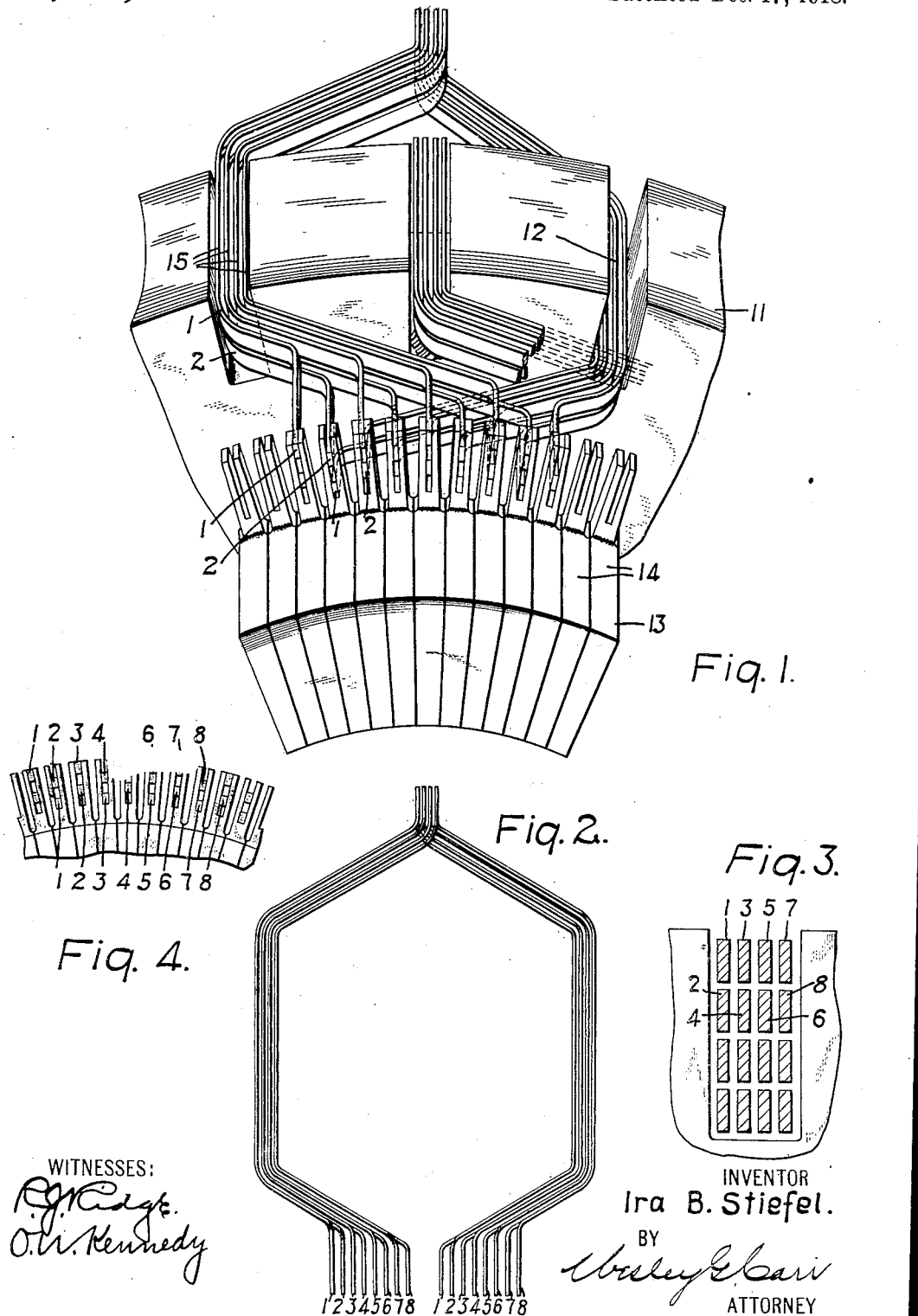

IRA B. STIEFEL, OF WILKINSBURG, PENNSYLVANIA, ASSIGNOR TO WESTINGHOUSE ELECTRIC AND MANUFACTURING COMPANY, A CORPORATION OF PENNSYLVANIA.

ARMATURE-WINDING FOR DYNAMO-ELECTRIC MACHINES.

1,287,788. Specification of Letters Patent. Patented Dec. 17, 1918.

Application filed December 8, 1915. Serial No. 65,682.

*To all whom it may concern:*

Be it known that I, IRA B. STIEFEL, a citizen of the United States, and a resident of Wilkinsburg, in the county of Allegheny and State of Pennsylvania, have invented a new and useful Improvement in Armature-Windings for Dynamo-Electric Machines, of which the following is a specification.

My invention relates to armature members for dynamo-electric machines, and it has for its object to provide an armature with a winding so constructed as to permit a relatively large number of armature conductors of economical cross section to be placed in each armature slot.

A further object of my invention is to provide an armature with a winding so constructed as to permit the use of a commutator cylinder comprising a large number of commutator bars in connection with a core member having relatively few coil-containing slots.

An armature constructed in accordance with my invention is particularly adapted for high-voltage electric railway motors, for, in such machines, it is essential that the diameter of the armature core be as small as possible and it is also desirable to have a small difference of potential between adjacent commutator bars. It is obvious that this last requirement can be met only by the use of a large number of commutator bars.

In the accompanying drawings, Figure 1 is a perspective view of a portion of an armature member provided with a winding constructed in accordance with my invention; Fig. 2 is a plan view of the assembled coils that are adapted to be located in a single core slot, the ends of the coils being spread apart to show their arrangement more clearly; Fig. 3 is a fragmentary sectional view showing the arrangement of the conductors in a core slot, and Fig. 4 is a fragmentary view showing the connections to the commutator cylinder.

The armature member of a dynamo-electric machine comprises a laminated core 11 having peripheral slots 12 and a commutator cylinder 13 composed of slotted commutator bars 14. Each core slot 12 contains an even number of armature conductors 15 that are arranged in side-by-side relation and in layers. Each separate conductor 15 constitutes one side of a single coil, the other side of which is located in another slot and at a different radial distance from the axis of the core 11. Thus, the coil 1 comprises the left-hand conductor of the upper layer in one slot and the left-hand conductor of the lower layer in another slot. Similarly the coil 2 has one side thereof located below the coil 1 in one slot, while the other side thereof is located above the coil 1 in the other slot. The coils contained in each slot are numbered 1 to 8, inclusive, and their arrangement is shown clearly in Figs. 2 and 3. In Fig. 1, the terminals of each coil are designated by the same reference characters and it is to be seen that the terminals of the same coil are connected to adjacent commutator bars 14. The terminals of the coils enter the slots of the commutator bars in four concentric rows and are connected to the bars as shown in Fig. 4.

From the foregoing, it is apparent that there are as many commutator bars as there are single coils, thus limiting the difference of potential between adjacent commutator bars. Furthermore, the location of a large number of single conductors arranged in layers in each slot permits the use of a core member having a relatively small number of deep slots. The arrangement of the conductors in several layers also permits the use of a better proportioned conductor than if an equal number of conductors were placed in side-by-side relation in the same slot. That is, the conductors may have a greater width, thus giving greater strength and reducing the eddy currents, as compared with a deep, thin conductor.

While I have shown my invention in a simple and preferred form, it is not so limited but is capable of various minor changes and modifications within the scope of the appended claims.

I claim as my invention:

1. An armature for dynamo-electric machines comprising a core provided with slots, a plurality of single coils arranged in side-by-side relation in each of said slots and each having its sides located respectively in the top and bottom portions of separate slots, the corresponding sides of the coils of a given group being disposed in "$n$" superposed layers in each slot, and a commutator cylinder having the same number of commutator bars as there are single coils, adjacent coils in the same layer and the same slot being connected to commutator bars having a relative spacing of "$n$" commutator bars.

2. An armature for dynamo-electric machines comprising a core provided with slots, a plurality of single coils arranged in layers in each of said slots, each of said coils having its sides located respectively in the top and bottom portions of separate slots, and a commutator cylinder having the same number of commutator-bars as there are single coils, adjacent coils of each separate layer being connected to alternate commutator bars.

3. An armature for dynamo-electric machines comprising a core provided with slots, a plurality of single coils arranged in layers in each of said slots, and a commutator cylinder having the same number of commutator bars as there are single coils, the coils of different layers lying in the same radial planes being connected to adjacent commutator bars.

4. An armature for dynamo-electric machines comprising a core provided with slots, a plurality of single coils arranged in layers in each of said slots, and a commutator cylinder having the same number of commutator bars as there are single coils, adjacent coils of each layer being connected to alternate commutator bars and coils of different layers lying in the same radial planes being connected to adjacent commutator bars.

5. An armature for dynamo-electric machines comprising a core provided with slots, a plurality of single coils arranged in side-by-side relation in each of said slots and each having its sides located respectively in the top and bottom portions of separate slots, the corresponding sides of the coils of a given group being disposed in two superposed layers in each slot, and a commutator cylinder having the same number of commutator bars as there are single coils, adjacent coils in the same layer and the same slot being connected to alternate commutator bars.

In testimony whereof I have hereunto subscribed my name this 27th day of Nov., 1915.

IRA B. STIEFEL.